Figure 1:
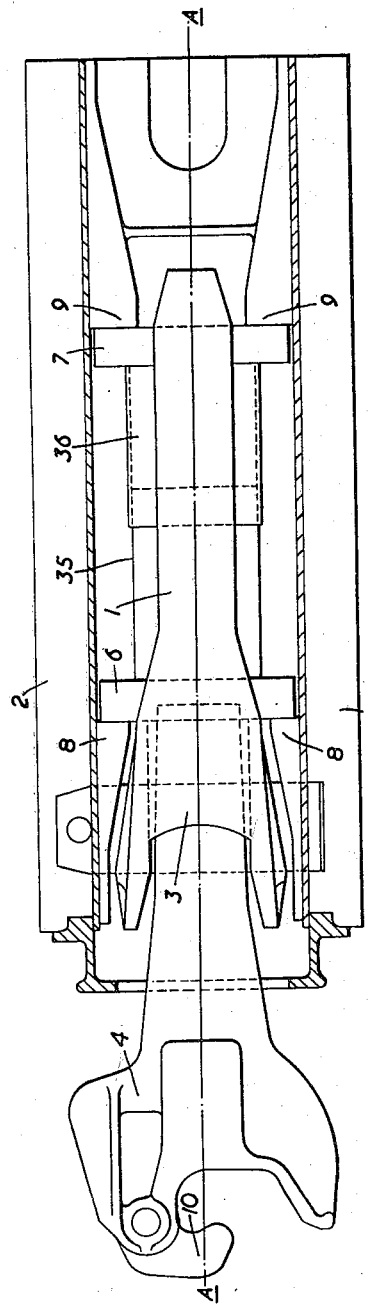

Dec. 8, 1964     F. W. SINCLAIR ETAL     3,160,285
DRAFT AND/OR BUFFING GEAR FOR RAILWAY VEHICLES
Filed Aug. 29, 1961     2 Sheets-Sheet 1

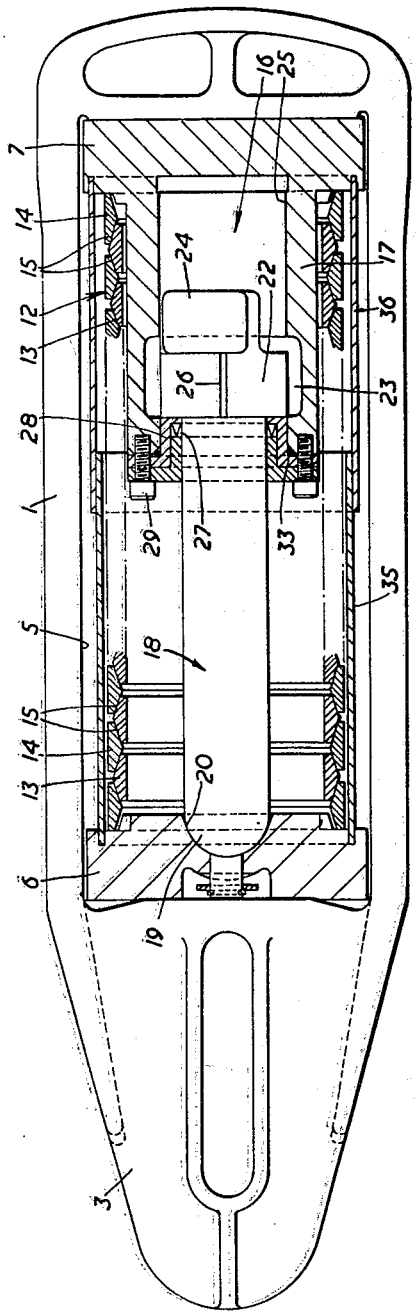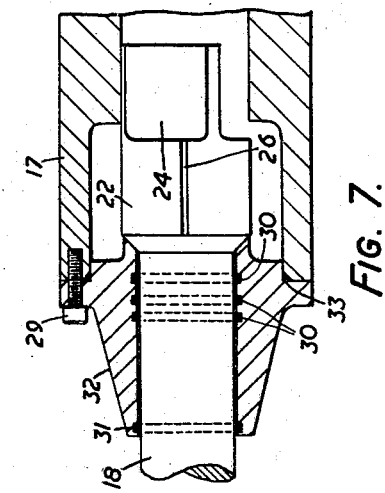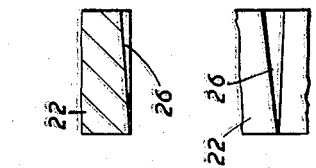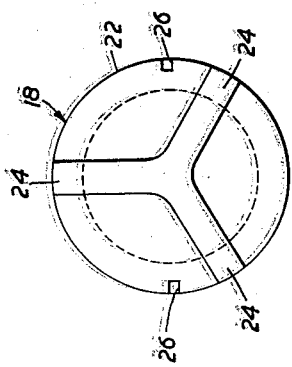

United States Patent Office 3,160,285
Patented Dec. 8, 1964

3,160,285
DRAFT AND/OR BUFFING GEAR FOR
RAILWAY VEHICLES
Frederick William Sinclair, Gloucester, and Max Hubert Prophet Alexander Le Vie, Finchfield, Wolverhampton, England, assignors to Gloucester Railway Carriage and Wagon Company Limited, and F. H. Lloyd and Company Limited
Filed Aug. 29, 1961, Ser. No. 134,692
Claims priority, application Great Britain, Aug. 30, 1960, 29,811/60
4 Claims. (Cl. 213—43)

This invention relates to draft and/or buffing gear for used with railway vehicles, and is of particular application to draft gear for use with centre couplers of vehicles on which no side buffers are provided so that the draft gear has to withstand both buffing and traction loads.

With railway draft gear which has to withstand both buffing and traction loads it has previously been a problem to provide gear which will withstand heavy buffing loads, as when shunting, and dissipate the high energies involved within the allowable limits of travel and yet will also withstand relatively light traction loads with a reasonable degree of resilience. Normally the draft gear incorporates a friction energy-absorbing spring which has an initial compressive loading of relatively high value so that the arrangement is not well suited for light traction loads, particularly on passenger vehicles where passenger comfort has to be considered.

According to the invention draft and/or buffing gear for a railway vehicle comprises friction energy-absorbing resilient means of the ring spring type in combination and in parallel with hydraulic energy-absorbing means, the arrangement being such that over an initial range of loading of the gear the load is withstood mainly or entirely by the resilient means and for heavier loading the hydraulic means are of increased effectiveness.

Preferably the hydraulic means are substantially ineffective during said initial range which is chosen to accommodate normal traction loading of the gear, and above this range the hydraulic means conveniently become progressively more effective. The hydraulic means may be arranged to provide a hydraulic lock at the maximum limit of travel of the gear.

As stated the resilient means comprise a friction energy-absorbing spring of the form commonly known as a "ring spring," in which a series of alternating inner and outer spring rings in the free condition partially nest one within the other. Axial compression of the spring forces the inner rings into the outer, with compression and extension of the inner and outer rings respectively, to oppose such compression and impose a high frictional load. The spring has an end ring of relatively weak construction so that the spring itself has a progressive rate, and the hydraulic means may comprise a dashpot which initially offers no resistance to fluid flow and has an exhaust port of progressively decreasing effective cross-section operative during the remainder of its stroke.

To enable the dashpot to be filled in situ or the fluid therein replenished, passages may be provided leading from a reservoir chamber to the base of the dashpot cylinder which are provided with suitable filling valves.

A tandem arrangement may be adopted utilizing a pair of ring springs arranged one within the other with the dashpot at the inner end of the springs. The dashpot may then be arranged to withstand buffing loads only. However, in a preferred arrangement a single ring spring is arranged around the dashpot, and this spring may be compressed between two follower plates or the like arranged within a yoke member formed for attachment to a coupler head or the like, so that one or other of the plates moves with the yoke member to compress the spring while the other follower plate engages a fixed stop. A plunger of the dashpot is preferably attached to one of the follower plates, and the dashpot cylinder may be attached to or formed integrally with the other follower plate. Alternatively, the dashpot cylinder may be fixed independently of the follower plates.

Figure 2:
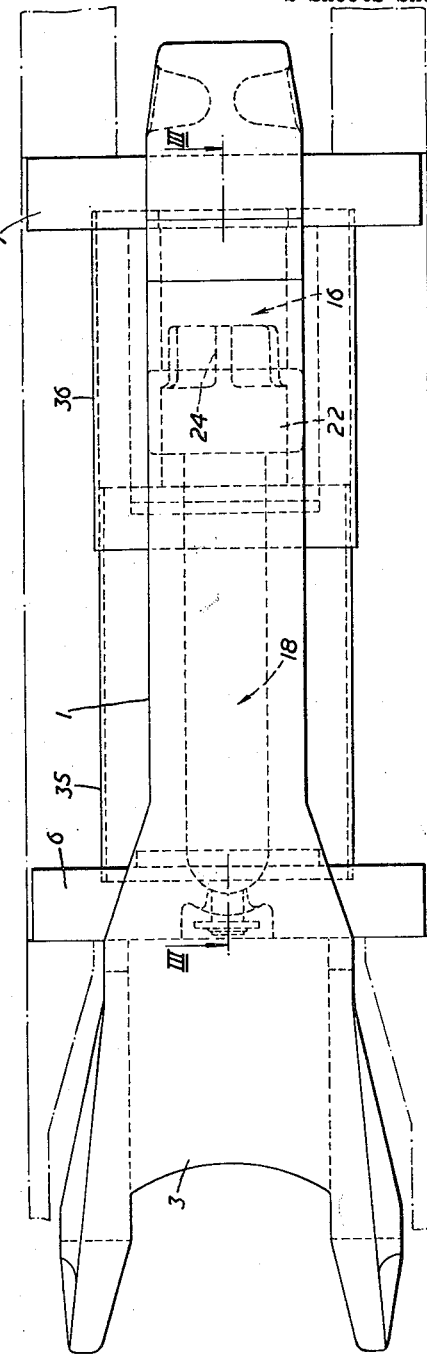

The invention will now be further described with reference to the accompanying drawings which illustrate, by way of example, one form of railway vehicle draft gear in accordance with the invention and a modification thereof, and in which:

FIGURE 1 is a plan view of the draft gear showing its arrangement between spaced longitudinal frame members of the vehicle, FIGURE 2 is a similar view of the draft gear itself showing additional hidden detail, FIGURE 3 is a side view of the draft gear partly in section on the line III–III in FIGURE 2, FIGURES 4 to 6 are fragmentary detail views, and FIGURE 7 is a fragmentary sectional view showing the modification.

The draft gear comprises a cast steel yoke 1 slidably mounted between the spaced longitudinal frame members 2 of the vehicle on the centre line A—A of the latter. The yoke 1 is formed at its outer end with a jaw 3 for attachment to an automatic coupler head 4 by means of a cross pin. As shown in FIGURE 3 the yoke 1 has a longitudinally arranged substantially rectangular aperture 5 at the ends of which two follower plates 6 and 7 are respectively arranged. The plates 6 and 7 project from both sides of the yoke 1 for engagement respectively with front stops 8 and rear stops 9 mounted on the frame members 2 and with which the follower plates 6 and 7 normally engage.

The general form of the coupler head 4 will be clear from FIGURE 1, but as the head forms no part of the invention it will not be described in detail herein. It will suffice to state that in the usual manner the head 4 is formed for automatic coupling engagement with a similar head on another vehicle, coupling being effected by a latching hook 10 which enters into latching engagement with the similar hook of the other coupler head.

A ring spring 12 forming resilient means of the gear is mounted between and in engagement with the follower plates 6 and 7 with a slight degree of initial compression which holds the plates 6 and 7 against the ends of the aperture 5. As usual the ring spring 12 comprises alternating inner and outer spring rings, such as 13 and 14 respectively, of continuous annular form. On compression the outer rings 14 are forced over the adjacent inner rings 13 with corresponding extension and compression of the rings and high frictional loading. Movement of the yoke 1 under buffing or traction loads sustained by the coupler head 4 results in one follower plate 6 or 7 moving with the yoke 1 relatively to the other plate 7 or 6 which is restrained by the corresponding stops 9 or 8 on the frame members 2.

As a result of such relative movement of the plates 6 and 7 the ring spring 12 is compressed to oppose the applied load resiliently and at the same time absorb energy as a result of friction between the individual spring rings 13 and 14. At least one end ring of the spring 12 is relatively weak as compared with the remainder, so that the spring rate is progressive over an initial range of its stroke, and the rings 13 and 14 have inclined interengaging faces such as 15 such that the spring 12 is self-recuperating when the axial load thereon is removed.

Hydraulic means in combination with the resilient means comprise a dashpot 16 the cylinder body 17 of which is formed integrally with the inner follower plate 7. A plunger 18 slidable within the dashpot cylinder 17 has a radiused outer end 19 engaging with a spherical seating 20 in the other or outer follower plate 6 and has a piston portion 22 normally disposed in a recuperating chamber 23 (as shown in FIGURE 3) at the outer end of the dashpot cylinder 17. At its inner end the plunger 18 has wings 24 which engage the cylinder bore 25 of the cylinder 17 and centralise the piston portion 22 relatively thereto. FIGURE 4 is a detail inner end view of the plunger 18, illustrating the form and arrangement of the wings 24 which centre the piston portion 22.

On compression of the ring spring 12 in the manner already described the dashpot 16 offers no resistance to relative movement of the follower plates 6 and 7 over an initial range of movement until the piston portion 22 enters the cylinder 17. Thereafter, continued movement of the piston portion 22 into the cylinder 17 expels fluid from the latter along two diametrically opposed grooves 26 which extend longitudinally along the side face of the piston portion 22 and form dashpot exhaust ports. These grooves 26 terminate just before reaching the lower face of the piston portion 22 and are of gradually decreasing cross-sectional area in a direction outwardly of the cylinder bore 25 so that resistance to movement of the piston portion 22 increases progressively throughout the effective portion of its stroke into the cylinder 17. At the limit of the stroke of the plunger the piston portion 22 has entered the cylinder 17 to a point beyond the termination of the grooves 26, thus preventing further escape of fluid from the cylinder through the grooves 26, so that a hydraulic lock is obtained which effectively determines this limit.

In order to provide the gradually decreasing cross-sectional area of the grooves 26 the latter may be of constant width as shown in FIGURE 3, and varying depth as shown in the fragmentary radial sectional view of the piston portion 22 in FIGURE 5. Alternatively the grooves 26 may be of constant depth and varying width as shown in the fragmentary side view of the piston portion in FIGURE 6.

As the draft gear is compressed past said initial range of movement both the spring 12 and the dashpot 16 share the load with an increasing proportion borne by the latter, fluid dispelled from the dashpot cylinder 17 through the port grooves 26 being retained within the recuperating chamber 23. During buffing loads, particularly with vehicle carriage shunting, it will be seen that the energy of the striking vehicle is dissipated not only by the inherent friction of the ring spring 12 but also in the work done displacing the dashpot fluid. At the end of the dashpot stroke or before, depending on the speed of the striking vehicle, or when the impressed load is reduced below that of the compressed spring, recoil takes place and the draft gear commences to restore itself to its original position. During such restoration the ring spring acts as the recuperating means and provides the axial force which withdraws the plunger 18 from the dashpot cylinder 17.

Referring particularly to FIGURE 3, the outer end of the recuperating chamber 23 is sealed by a lip-type seal 27 located in a housing 28. The housing is attached to the end of the cylinder 17 by a ring of bolts such as 29, and the lip of the seal 27 wipes the cylindrical surface of the plunger 18. The seal lip is inwardly facing to provide a pressure-assisted seal. In the modification illustrated in FIGURE 7, sealing is achieved by three spaced O rings 30 and an outer smaller lip-type seal 31 which all engage the surface of the plunger 18. The rings 30 and seal 31, which together provide a multiple seal are individually located in annular grooves in a housing 32 also attached to the cylinder 17 by a ring of bolts 29. In both figures an O-ring seal 33 is provided to prevent leakage between the housing 28 or 32 and the end of the cylinder 17.

Hydraulic means of the type described provide a reacting load proportional to the square of speed of the impacting mass and hence at low speeds or small mass the ring spring 12 predominates as the reactive unit, whilst for large masses or high speeds the dashpot 16 predominates. It will thus be appreciated that the described embodiment can cater for all conditions of weight and speed within the designed limits and at the same time offers the benefit that it disperses large amounts of energy, such as are involved when vehicles collide, and allows for relatively free resilient movement in the initial stage of compression.

It will be appreciated that the operation of the draft gear under traction conditions is similar to that described for buffing loads.

In order to protect the ring spring 12 from dirt and wet this spring is enclosed in a telescopic cover having two telescoped parts 35 and 36. The outer ends of the parts 35 and 36 seat into the follower plates 6 and 7 respectively, so that they are sealed relatively to the follower plates and move therewith.

We claim:
1. Draft gear for a railway vehicle comprising two follower members, a ring spring having a weakened section acting directly between the said follower members, and hydraulic energy-absorbing means directly between said two follower members and acting in parallel with said ring spring.

2. Draft gear according to claim 1 wherein the ring spring is arranged to withstand at least the main portion of an applied load, and the hydraulic means are substantially ineffective during the initial part of the range of movement.

3. Draft gear according to claim 2, wherein above said initial range the ring spring becomes progressively less effective and the hydraulic means become progressively more effective.

4. Draft gear according to claim 1, wherein the hydraulic means are arranged to provide a hydraulic lock at the maximum limit of travel of the gear.

References Cited in the file of this patent

UNITED STATES PATENTS

| | | |
|---|---|---|
| 879,545 | Hien | Feb. 18, 1908 |
| 1,750,455 | Bell et al. | Mar. 11, 1930 |
| 1,797,639 | Couch | Mar. 24, 1931 |
| 2,914,195 | Pawling | Nov. 24, 1959 |
| 2,948,413 | Zanow | Aug. 9, 1960 |

FOREIGN PATENTS

| | | |
|---|---|---|
| 1,121,116 | France | Feb. 4, 1955 |